United States Patent Office 3,748,313
Patented July 24, 1973

3,748,313
ONE-PART POLYTHIOL COMPOSITIONS CONTAINING ENCAPSULATED ACTIVATORS
George F. Bulbenko, Levittown, Pa., and Earl H. Sorg, Trenton, and John P. Gallagher, Hamilton Square, N.J., assignors to Thiokol Chemical Corporation, Bristol, Pa.
No Drawing. Continuation-in-part of application Ser. No. 128,150, Mar. 25, 1971, which is a continuation of application Ser. No. 844,211, July 23, 1969, now abandoned. This application July 24, 1972, Ser. No. 274,761
Int. Cl. C08g 23/00
U.S. Cl. 260—79
12 Claims

ABSTRACT OF THE DISCLOSURE

Storage-stable, curable, substantially anhydrous liquid polythiol polymer sealant or adhesive compositions having incorporated therein a substantially anhydrous dormant curing agent for the polymer, and mechanically fracturable capsules containing an activator for the curing agent, e.g., water. The cure of the composition is initiated at the time of application by subjecting the composition to mechanical forces, as for example, by passing through a gear pump.

---

This application is a continuation-in-part of Ser. No. 128,150 filed Mar. 25, 1971, which is a continuation of Ser. No. 844,211 filed July 23, 1969, both now abandoned.

BACKGROUND OF THE INVENTION

This invention relates to one-part, storage-stable, curable liquid polythiol polymer sealant or adhesive compositions having incorporated therein a substantially anhydrous dormant curing agent and an encapsulated activator for said curing agent and to a process for effecting the cure of such compositions.

Liquid polythiol polymers such as disclosed, for example, in U.S. Pats. 2,230,390; 2,436,137; 3,243,411; 2,466,963 and 2,789,958 have found a wide variety of applications because of the properties of the cured polymers. These polymers have found extensive use in sealants, caulking compounds, adhesives, and the like. Because of the nature of the curing agents for such polymers, for a long time it was not possible to compound polythiol polymer compositions into one-part, storage-stable, commercially acceptable products. It was therefore necessary to compound the composition immediately prior to use, or to package the ingredients in two parts, one containing the polythiol polymer and the other containing the curing agent. Then a number of moisture-activated, one-part polythiol polymer compositions were developed as shown, for example, in U.S. 3,225,017; 3,349,047; 3,402,151 and 3,402,155. These compositions cure to elastomeric solids upon exposure to surroundings containing moisture. The length of time required for cure varies according to the amount of moisture available specific curing mechanism. This can sometimes be a disadvantage from a practical standpoint, especially in assembly lines in automobile production or production of prefab housing components where rapid cures are desirable, if not critical. One way to hasten the cure of water-activated polythiol polymer based compositions is to apply water by means of a brush or spray to the surface of the composition. However, this is time-consuming and not always practical in commercial applications. The same principle has been used to hasten the cure of base-activated polythiol compositions as described in British Pat. 901,600.

SUMMARY OF THE INVENTION

Accordingly, the primary object of the present invention is to provide a storage-stable, one-part liquid polythiol polymer based sealant or adhesive composition which can be activated as applied to provide a rapid cure at ambient temperatures.

A secondary object of the invention is to provide a process for activating the above-described compositions by a simple mechanical means.

The above objects are accomplished by first forming a storage-stable curable sealant or adhesive composition by mixing together a substantially anhydrous polythiol polymer, one or more substantially anhydrous dormant curing agents for the polymer, and one or more curing agent activators encapsulated in mechanically fracturable, impervious capsules made of a material which is substantially insoluble in and non-reactive with any of the components of the composition and then, when desired, subjecting the composition to mechanical forces, whereby the activator capsules are ruptured and a cure is initiated as the composition is applied to a substrate.

DESCRIPTION OF THE PREFERRED EMBODIMENTS

There are three essential components of the compositions of the present invention, namely, a substantially anhydrous liquid polythiol polymer, i.e., a substantially anhydrous polythiol polymer which is pourable at 25° C., or a substantially anhydrous blocked polymer which behaves like a polythiol polymer upon cure; a substantially anhydrous dormant curing agent for the polymer, i.e., a curing agent which will not cure the polymer under anhydrous conditions in the absence of an activator; and an encapsulated activator for the curing agent. For technical reasons, it may be desirable to use a mixture of two or more curing agents or a mixture of two or more activators. In addition, the compositions may contain the various additives commonly used in sealant, caulking or adhesive compositions such as fillers, pigments, solvents, plasticizers, thixotropic agents and the like. Specific examples of the essential components are given below.

Polythiol polymers

Examples of the types of liquid polythiol polymers which are suitable for use in the compositions of the present invention are listed below. As can be seen, the important points are (1) that the polymer have —SH groups or groups which, during curing, behave as —SH groups, e.g., blocked —SSH groups, and (2) that the polymer be substantially anhydrous. The hydrocarbon backbone may be saturated or unsaturated aliphatic, or aromatic and may be interrupted by groups such as ether, thioether, siloxyl, urethane or polysulfide.

(a) Liquid polyalkylene polysulfide polymers having —SH terminals prepared as described in U.S. Pat. 2,466,963 and which have molecular weights of the order of 500 to 25,000 and which are viscous liquids having viscosities within the range of 300 to 100,000 centipoises at 25° C. The commercially important liquid polymers of this type are particularly described in articles by Fettes and Jorczak, published in "Industrial and Engineering Chemistry," Volume 42, page 2217 (1950), and Volume 43, page 324 (1951). They are generally prepared from bis-beta-chloroethyl formal and are essentially composed of recurring -(SCH$_2$CH$_2$OCH$_2$OCH$_2$CH$_2$S)- groups and have free mercapto terminals through which they may be cured to form a solid elastomer. In the manufacture of these commercial polymers, a small percentage of trichloropropane is commonly mixed with the bis-beta-chloroethyl formal to provide a slightly cross-linked structure upon cure. Particularly commercially valuable polymers include those having preferably recurring groups, such as (ethyleneoxy)methane, bis(butyleneoxy)methane, bis(ethylene)oxy, and bis(butylene)oxy and an average molecular weight of approximately 2,000 to 10,000 and preferably 3,500 to 8,000.

(b) Liquid —SSH terminated high rank polysulfide polymers are described in U.S. Pat. 3,331,818, or in blocked form wherein the —SSH terminals are blocked with aldehydes or ketones as described in U.S. Pat. 3,422,077.

(c) Liquid —SH terminated polyethers such as —SH terminated polypropylene glycol as disclosed in U.S. Pats. 3,258,495; 3,361,723 and 3,431,239.

(d) —SH terminated hydrocarbon polymers such as —SH terminated polybutadiene as disclosed in U.S. Pat. 3,234,188 and in "Chemical & Engineering News," Apr. 4, 1966, page 37; —SH terminated butadiene/acrylonitrile copolymers and the alkanepolythiol, aralkanepolythiol, and arenepolythiol polymers disclosed in U.S. Pats. 2,230,390; 2,436,137 and 3,243,411.

(e) Liquid —SH terminated polyurethanes such as disclosed in U.S. Pats. 3,440,273 and 3,446,780.

(f) Liquid —SH terminated poly(alkylene sulfide) polymers as disclosed in U.S. Pats. 3,056,841 and 3,070,580.

(g) Liquid gem-dithioether polythiol polymers as disclosed in U.S. Pat. 3,413,265.

(h) Liquid —SH terminated hydrocarbon polysulfide polymers as disclosed in U.S. Pat. 3,423,374.

Curing agents

A wide variety of organic and inorganic curing agents are known for liquid polythiol polymers. An extensive list of these is given in Gaylord, "High Polymers," volume XIII "Polyethers" part III, page 165, Interscience Publishers, New York (1962) and in U.S. Pats. 3,225,017 and 3,402,155. A recently discovered addition to this list is calcium orthoplumbate whose use as a curing agent is described in Ser. No. 770,861 filed Oct. 25, 1968, now Pat. No. 3,583,954 in the name of A. F. Vondy. As described therein, calcium orthoplumbate is a dormant water-activatable curing agent and is normally used in an amount ranging from about 12% to about 50% by weight of the liquid polythiol polymer. Roughly about one-half mole of water is necessary to activate one mole of calcium orthoplumbate.

The preferred curing agents for use in the present invention are those which are dormant under substantially anhydrous conditions but upon activation will provide a rapid cure of the polymer. Included in this category are calcium orthoplumbate, calcium peroxide, barium peroxide, lithium peroxide, zinc peroxide, and manganese dioxide. The latter two curing agents require a basic activator whereas the first four, being basic themselves, require only water as an activator. Additional base can be added if desired to further accelerate the cure. Of course, the principles of this invention can also be applied to slower curing systems such as, for example, those activated by iodine donors as described in U.S. Pat. 2,727,883, and the water-activated chromate and bichromate curing systems described in U.S. Pat. 2,787,826. Suitable curing systems for any particular polymer are well-known to those skilled in the art and the selection of a suitable curing agent is determined by the rate of cure and properties desired in the final composition.

Encapsulated activators

As indicated above, the most common substances which are art-recognized as activating the cure of liquid polythiol polymer compositions are water and bases. The latter may include organic amines such as disclosed in British Pat. 901,600, incorporated herein by reference. Examples include diethylene triamine, ethylene diamine, n-butylamine, triethanolamine, triethylene tetramine, dibutylamine, tri(dimethylaminomethyl)phenol, and piperidine. Other basic inorganic compounds such as ammonia or alkali and alkaline earth oxides, hydroxides or salts of weak acids may also be used. For the purposes of this invention, it is preferred that the activator be a liquid or in solution, although slower acting solid activators could be used if desired.

The encapsulating material for the activator capsules should be a material which is relatively inert and impervious with respect to all the ingredients used in the curable polythiol polymer composition. It should have a fairly high melting point, preferably greater than 170° F., so as to withstand elevated temperatures which might occur during storage. Suitable substances include gelatin, gelatin/gum arabic, methyl cellulose, starch, polyurethanes and waxes. The principal requirements are that the material be mechanically rupturable by any of the methods described hereafter and be substantially chemically inert to the activator and the other ingredients of the composition. The rupturability of the capsules depends to a large extent upon the size of the capsules and the thickness of the capsule walls, also measured in terms of payload. For The characteristics of the capsules used in Examples 6-20 are listed in Table III.

TABLE III

| | Example | | | | |
|---|---|---|---|---|---|
| | 6-8 | 9-10 | 11-13 | 14-19 | 20 |
| Size (μ) | 1,190-1,680 | 840-1,410 | 840-1,410 | 2,000-3,360 | 800 |
| Payload (percent) | 68 | 49.5 | 55.7 | 57.8 | 60 |
| Melting point (° F.) | 130 | 172-178 | 125 | 178-185 | >160 |
| Rupturability (lbs./capsule) | | | 1.04 | | |
| Package stability at: | | | | | |
| 70° F | >2W | >2W | >2W | >2W | |
| 105° F | 1-2W | >2W | | >2W | |
| 120° F | 5-7Da | >2W | 2-4W | | NT |
| 130° F | | 5-7Da | 1-3Da | >3W | |
| 158° F | | 2Da | | 3-7Da | |

W=Weeks. Da=Day(s). NT=Not tested.

The capsules used in Examples 14–19 were coated with hydrophobic starch.

EXAMPLES 21–26

Various encapsulated activators were hand mixed with 100 g. of Polymer E and 5 g. $MnO_2$ (inactive form) using 1.25 g. of each activator as shown in the following table. Stability of the same uncured mixtures containing, in addition, 50 g. of Sterling MT carbon black, was observed.

TABLE IV

| Example | Activator | Capsule size (μ) | Stability at 55° C. (days) |
|---|---|---|---|
| 21 | NaOH | 297 | 1-3 |
| 22 | NaOH | 297-590 | 1-3 |
| 23 | Ethylene diamine | 297 | <1 |
| 24 | do | 297-590 | <1 |
| 25 | Glycerine 10% | 297-540 | 1-3 |
| 26 | Quaternary ammon. salt 1% | 1,410-1,680 | >1 |

What is claimed is:

1. A storage-stable curable polythiol polymer composition which comprises a mixture of
   (a) a substantially anhydrous liquid polythiol polymer having terminals selected from the group consisting of —SH and —SSH terminals;
   (b) an effective amount of at least one substantially anhydrous dormant curing agent for said polymer; and
   (c) mechanically fracturable capsules having a payload of about 25 to 95 percent by weight and a rupturability of about 0.1 to 5 pounds per capsule and containing at least one activator for said curing agent and encapsulated with a substantially impervious shell which is substantially non-reactive with the components of said polymer composition; the total amount of activator present in said capsules being sufficient to activate said curing agent.

2. A composition as in claim 1 wherein the activator is selected from the group consisting of water and organic amines.

3. A composition as in claim 1 wherein the activator is water.

4. A composition as in claim 1 wherein the activator is an organic amine.

5. A composition as in claim 1 wherein the activator is a mixture of organic amines.

6. A composition as in claim 4 wherein the organic amine is selected from the group consisting of diethylene triamine, dibutylamine, ethylene diamine, tri(dimethylaminoethyl) phenol, piperidine, and quaternary ammonium salts.

7. A composition as in claim 2 wherein the size of the capsules is from about 100 to about 4000μ.

8. A composition as in claim 1 wherein the substantially anhydrous liquid polythiol polymer is selected from the group consisting of polyalkylene polysulfide polythiol polymers, —SSH terminated high rank polysulfide polymers, blocked high rank polysulfide polymers, polyether any given size of capsule, the larger the payload (amount of encapsulated material), the thinner the shell. For the purposes of the present invention, the capsule specifications listed below are suitable. They may be prepared by known encapsulation methods, such as described in "Chemical Engineering," Dec. 4, 1967, page 177, FIG. 7.

CAPSULE SPECIFICATIONS

|  | Broad range | Preferred range |
|---|---|---|
| Size ($\mu$) | 50–5,000 | [a] 100–1,000<br>[b] 1,000–4,000 |
| Payload (percent) | 25–95 | 50–65 |
| Rupturability (lbs./capsule) | 0.1–5 | 0.5–2 |
| Wt. loss (based on weight of activator present) open to atmosphere: |  |  |
| Percent/day at 75° F | 0.01–0.15 | 0.05–0.1 |
| Percent/day at 130° F | 1.5–6.5 | 2–4 |

[a] This size range is recommended for use in applications requiring a fine dispersion of activator. However, a stronger mechanical force must be used to rupture the capsules, as for example by means of a paint mill, rotor impeller mixer, or a gear pump.
[b] This range can be used where fine dispersions are not required. The capsules are more easily rupturable and can be broken by hand mixing if desired, although other more forceful means such as a gear pump or rotor impeller mixer may also be used, especially for large scale commercial applications.

The rupturability of the capsules depends on the brittleness of the shell material and is also a function of both the size and the payload, larger sizes and payloads having the higher rupturability. Although capsules having low rupturability are desirable, from an application standpoint, care must be taken not to cause premature rupturing of the capsules when dispersing them into premixed formulations. For small batches, the capsules may be "folded in" by hand. For commercial applications, a mixer such as a "Meyers" mixer, a "Hobart" mixer or a "Marco Rotofeed" mixer is suitable. A "Pyles" pump may be used for transferring the capsule-containing sealant without premature undue rupturing of the capsules. As would be expected, the less handling during incorporation of the capsules or during transfer through pipes or tubing, the more stable the composition during storage.

Methods of activation

Small quantities of the polythiol compositions of the present invention may be activated by grinding using a mortar and pestle or by mixing in a small container using a propeller-type mixer. For applications where a thin coating is used to bond two substrates, simple pressure and shearing force applied on the substrates would be sufficient to activate the cure of the composition. However, for large volume commercial sealant applications, the simplest manner of activation is to pump the composition through a gear pump or a Pyles rotor impeller mixing head which will provide the shear forces necessary to rupture the capsules just prior to application in one continuous process. In general, therefore, the compositions of the present invention may be activated by any mechanical means which will provide sufficient pressure and/or shear forces to rupture the activator capsules thus releasing and mixing the activator into the composition to initiate the cure by the dormant curing agent already present therein.

Examples 1–5 as shown in Table I illustrate the variety of curable polythiol polymer compositions which may be used in the practice of the present invention. The ingredients of each formulation, except for the water capsules, were milled together on a paint mill. On the following day, the water capsules were folded in by hand. Samples of the final compositions were tested for stability, that is, non-curing during storage at room temperature and at 50° C. Samples were also tested for curability by rupturing the activator capsules by mixing approximately 100 grams of each composition in a half pint can with a double propeller mixer at 1100 r.p.m. for 3–5 minutes. The chemical nature of the liquid polythiol polymers used is as follows:

| Polymer | Percent SH | Mol. wt. | Backbone |
|---|---|---|---|
| A | 1.38 | 4,780 | Polyether containing aromatic groups. |
| B | 2.3 | 2,000–3,000 | Polypropylene glycol containing urethane groups. |
| C | 2.2 | 3,000 | Butadiene/acrylonitrile, 75/25. |
| D |  | 4,000 | $HS(C_2H_4OCH_2OC_2H_4SS)_{23}C_2H_4OCH_2—OC_2H_4SH$ with 2% crosslinking. |
| E |  | 4,000 | Similar to D with only 0.5% crosslinking. |

The amounts of ingredients given in the table are in parts by weight. The polymers and the dormant curing agents were substantially anhydrous. The water capsules used in Examples 1, 2, 4 and 5 were encapsulated with a wax having a melting range of 179–184° F. The size range of the capsules was 2000–3360, with a payload of 60.6%. The weight loss of the capsules ranged between 0.12–0.09% at 75° F., 50% relative humidity for a period of 19 days.

TABLE I

|  | Example |  |  |  |  |
|---|---|---|---|---|---|
|  | 1 | 2 | 3 | 4 | [a] 5 |
| Polymer | A(100) | B(100) | C(100) | D(200) | E(100) |
| Zinc peroxide | 2 |  |  |  |  |
| Calcium orthoplumbate |  |  |  | 40 |  |
| Calcium peroxide |  | 6 |  |  | 8 |
| Manganese dioxide |  |  | 5 | 5 |  |
| Titanium dioxide | 50 |  |  |  |  |
| Calcium oxide |  |  |  | 10 |  |
| Calcium carbonate |  | 20 |  | 50 | 5 |
| Chlorinated biphenyl plasticizer |  |  |  |  | 40 |
| Poly-α-methyl styrene plasticizer | 40 | 40 | 40 |  |  |
| Sterling R carbon black |  |  |  |  | 20 |
| Sterling MT carbon black |  |  | 50 |  | 50 |
| SRF carbon black |  |  |  | 60 |  |
| Ethylene diamine percent on 5A sieves | 5 |  |  |  |  |
| Potassium t-butyl alcoholate |  | 1 | 0.2 |  |  |
| Triethanolamine |  |  |  |  | 0.5 |
| Toluene |  |  |  |  | 3.5 |
| Water capsules | 7 | 5 | 5 | 12 | 5 |
| Room temperature stability (days) |  |  |  |  | >84 |
| Stability at 50° C. (days) | <6 | >48 | >25 | >6 | [b] >14 |
| Curing time after mechanical activation (hours) | <24 | Immed. | 1 | Immed. | 1 |

[a] Also contained 0.5 part each of a surfactant and a UV stabilizer.
[b] At 105° F.

EXAMPLES 6–20

The examples listed in Table II illustrate the invention and include such variables as capsule size, plasticizers, solvents, and other additives.

polythiol polymers, hydrocarbon polythiol polymers, polyurethane polythiol polymers, polythioether polythiol polymers and gem-dithioether polythiol polymers.

9. A composition as in claim 2 wherein the substantially anhydrous liquid polythiol polymer is selected from the group consisting of polyalkylene polysulfide polythiol polymers, —SSH terminated high rank polysulfide polymers, blocked high rank polysulfide polymers, polyether polythiol polymers, hydrocarbon polythiol polymers, polyurethane polythiol polymers, polythioether polythiol polymers and gem-dithioether polythiol polymers.

10. A composition as in claim 9 wherein the dormant curing agent is calcium peroxide, the polymer is an alkylene polysulfide polythiol polymer, and the activator is water.

11. A composition as in claim 10 wherein the capsules have a size from about 100 to 4000μ.

12. A storage-stable, curable polythiol polymer composition which comprises a mixture of
(a) a substantially anhydrous liquid polythiol polymer wherein the liquid polythiol polymer is selected from the group consisting of polyalkylene polysulfide polythiol polymers, —SSH terminated high rank polysulfide polymers, blocked high rank polysulfide polymers, polyether polythiol polymers, hydrocarbon polythiol polymers, polyurethane polythiol polymers, polythioether polythiol polymers and gem-dithioether polythiol polymers;
(b) an effective amount of at least one substantially anhydrous dormant curing agent for said polymer, the dormant curing agent being selected from the group consisting of calcium peroxide, calcium orthoplumbate, manganese dioxide, lithium peroxide, barium peroxide, zinc peroxide; and
(c) mechanically fracturable capsules having a payload of about 25 to 95 percent by weight and a rupturability of about 0.1 to 5 pounds per capsule and containing an activator for said curing agent and encapsulated with a substantially impervious shell which is substantially non-reactive with the components of said polymer composition; the total amount of activator present in said capsules being sufficient to activate said curing agent, the activator being selected from the group consisting of water and organic amines.

References Cited
UNITED STATES PATENTS

| | | | |
|---|---|---|---|
| 3,505,254 | 4/1970 | Kidwell et al. | 260—3 |
| 2,466,963 | 4/1949 | Patrick et al. | 260—79.1 |
| 3,275,579 | 9/1966 | Stierli et al. | 260—6 |

DONALD E. CZAJA, Primary Examiner

M. I. MARQUIS, Assistant Examiner

U.S. Cl. X.R.

260—9, 13, 28, 33.8 R, 37 R, 77.5 AA, 79.1, 858